United States Patent
Ofel

(10) Patent No.: US 7,647,399 B2
(45) Date of Patent: Jan. 12, 2010

(54) SYSTEM AND METHOD FOR COMPARING A SERVICE LEVEL AT A REMOTE NETWORK LOCATION TO A SERVICE LEVEL OBJECTIVE

(75) Inventor: Gal Ofel, Tel-Aviv (IL)

(73) Assignee: Shunra Software Ltd., Kfar Saba (IL)

( * ) Notice: Subject to any disclaimer, the term of this patent is extended or adjusted under 35 U.S.C. 154(b) by 618 days.

(21) Appl. No.: 11/294,614

(22) Filed: Dec. 6, 2005

(65) Prior Publication Data

US 2007/0130306 A1 Jun. 7, 2007

(51) Int. Cl.
*G06F 15/173* (2006.01)
*G06F 12/00* (2006.01)

(52) U.S. Cl. .................... 709/224; 709/250

(58) Field of Classification Search ............... 709/203, 709/223–227, 250
See application file for complete search history.

(56) References Cited

U.S. PATENT DOCUMENTS

| | | | | |
|---|---|---|---|---|
| 5,893,905 | A * | 4/1999 | Main et al. ............. | 705/11 |
| 6,725,399 | B1 | 4/2004 | Bowman | |
| 6,748,433 | B1 * | 6/2004 | Yaakov .................. | 709/224 |
| 7,173,910 | B2 * | 2/2007 | Goodman ............... | 370/252 |
| 7,299,284 | B2 * | 11/2007 | McKinnon et al. ..... | 709/225 |
| 2003/0229695 | A1 | 12/2003 | McBride | |
| 2005/0080893 | A1 * | 4/2005 | Castellanos et al. .... | 709/224 |
| 2006/0085544 | A1 * | 4/2006 | Chen et al. ............ | 709/226 |

OTHER PUBLICATIONS

IT Guru Opnet 2004 Opnet Technologies Inc www.opnet.com.
Precise accurate performance analysis; Compuware Application Vantage—Aug. 2005 Compuware www.compuware.com.
End-to-end application service management Compuware www.compuware.com.
IPS Capacity Manager Production Sytems Capacity Management Hy Perform ix 2005 HyPerform, Inc www.hyperformix.com.
IPS Performance Designer Hy Perform ix 2005 HyPerform, Inc www.hyperformix.com.
IPS Performance Optimizer Hy Perform ix 2005 HyPerform Inc. www.hyperformix.com.
Control application growth with confidence Compuware Corporation www.compuware.com.

* cited by examiner

*Primary Examiner*—Zarni Maung
(74) *Attorney, Agent, or Firm*—Pearl Cohen Zedek Latzer, LLP

(57) ABSTRACT

A system and method to store a service level objective, produce one or more network conditions on a first network link where such network condition matches the state of such network condition on a second network link, and where the second network link connects to a remote network location, execute a transaction of an application over the first network link and predict if a service level of the transaction of the application over the second network link reaches the stored service level objective.

26 Claims, 2 Drawing Sheets

SYSTEM AND METHOD FOR COMPARING A SERVICE LEVEL AT A REMOTE NETWORK LOCATION TO A SERVICE LEVEL OBJECTIVE

FIELD OF THE INVENTION

The present invention generally relates to computer networks. More particularly, the present invention relates to a system and method for evaluating a service level of transactions conveyed over a network link to a remote location.

BACKGROUND OF THE INVENTION

Network capacity planning may measure a network's ability to serve users at remote locations at an acceptable speed and with acceptable transaction success rates. The process may involve measuring the computing resources that may be necessary to support users at a remote location in their use of a particular application. Among the constraints on the performance of a network are bandwidth, latency, bandwidth utilization, packet loss rate, jitter rate and others.

Factors that may be considered for evaluating a performance of an application at a remote network location may include a transaction response time (TRT) that a user at a remote location may encounter when for example requesting a transfer of data from a remote server or the updating of data to a remote data base. A maximum permissible range for a TRT may be known as a service level objective (SLO).

Prior network capacity systems, either analytical and/or discreet event simulation tools may model network communication constraints on links with remote locations, and may execute transactions of an application on such models. Modeling network constraints, characteristics or conditions to remote network locations is subject to inaccuracies and inconsistencies and is heavily dependent on the integrity of the model being used.

SUMMARY OF THE INVENTION

Embodiments of the invention include a method or system for storing a service level objective producing a network condition on a first network link, such network condition matching the same network condition on a second network link, where the second network link connects the network to a remote network location executing a transaction of an application over the first network link, and predicting if a service level of the executed transaction of the application over the second network link reaches the stored service level objective.

In some embodiments, the storing of the service level objective may include storing a metric such as a measure of a performance rate, success rate and consistency of the performance of transaction of the application on the network. In some embodiments, producing the network condition may include producing a network condition in a range of network conditions that may be found on for example a network link with a remote network point or client. In some embodiments, producing network conditions may include altering concurrently more than one network condition while keeping another network condition constant. In some embodiments, network conditions may include bandwidth, latency, packet loss, filtering, route changes, queuing, load balancing, packet modification, quality of service mechanisms, multi protocol label switching, virtual LAN, out-of-order, packet duplication, fragmentation, time to live effects, link faults, congestion and bandwidth utilization. In some embodiments, storing a service level may include storing a quality of experience rate at the remote link of the transaction of the application.

In some embodiments, several clients or network points such as remote clients or virtual remote clients may concurrently execute the transaction or one or more other transactions of one or more other application, and such clients may log-on to or join the network at a pre-defined ramp up rate. In some embodiments, the prediction may include a prediction of a maximum number of clients whose transactions of an application meet the service level objective, or a prediction of a level of a network condition at which the transaction fails to reach the service level objective.

In some embodiments, a memory may include storing a series of pre-defined transactions, executing the pre-defined transactions, recording a service level on one or more of the pre-defined transactions. In some embodiments a value or importance level of a performance metric on particular transaction may be defined for purposes of deriving a quality or experience or for purposes of determining if a service level has been achieved.

BRIEF DESCRIPTION OF THE DRAWINGS

The subject matter regarded as the invention is particularly pointed out and distinctly claimed in the concluding portion of the specification. The invention, however, both as to organization and method of operation, together with features and advantages thereof, may best be understood by reference to the following detailed description when read with the accompanied drawings in which:

DETAILED DESCRIPTION OF THE PREFERRED EMBODIMENTS

In the following description, various embodiments of the invention will be described. For purposes of explanation, specific examples are set forth in order to provide a thorough understanding of at least one embodiment of the invention. However, it will also be apparent to one skilled in the art that other embodiments of the invention are not limited to the examples described herein. Furthermore, well-known features may be omitted or simplified in order not to obscure embodiments of the invention described herein.

Unless specifically stated otherwise, as apparent from the following discussions, it is appreciated that throughout the specification, discussions utilizing terms such as "selecting," "processing," "computing," "calculating," "determining," or the like, refer to the actions and/or processes of a computer, computer processor or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

The processes and functions presented herein are not inherently related to any particular computer, network or other apparatus. Embodiments of the invention described herein are not described with reference to any particular programming language, machine code, etc. It will be appreciated that a variety of programming languages, network systems, protocols or hardware configurations may be used to implement the teachings of the embodiments of the invention as described herein.

Figure 1:
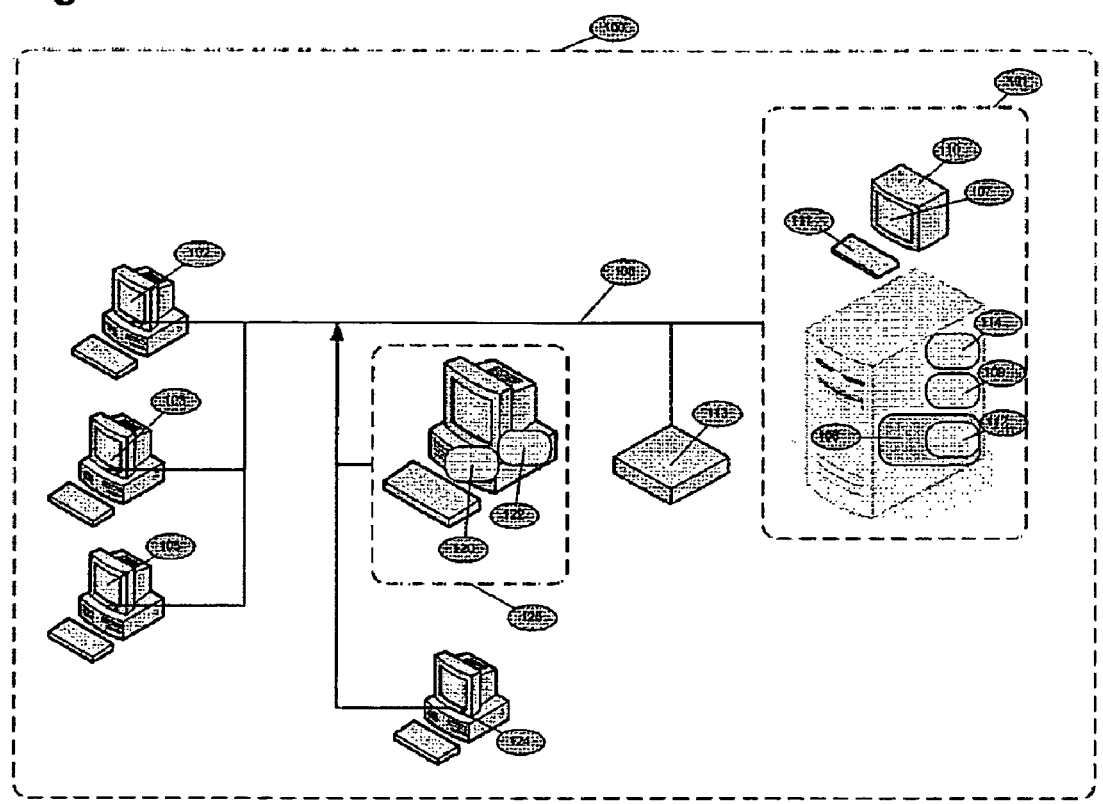
FIG. 1 is a conceptual illustration of components of a network having a point at a remote location, including a server electronically coupled to a one or more of such remote locations and to a processor that may produce network conditions or impose network constraints on a link or path, in accordance with a preferred embodiment of the present invention.

Reference is made to FIG. 1, a conceptual illustration of components of a network 100 having a point or client 102 at a remote location, including a server 101 electronically coupled to one or more clients 102 at the remote locations or other locations and to a computing platform 126 that may produce network conditions or impose network constraints on a link or path between for example the server 101 and the remote client 102, in accordance with a preferred embodiment of the present invention.

In operation and in some embodiments, a memory unit 113 may for example record, track or estimate the level, prominence or severity of various network conditions that may be found or assumed to exist in a network link or path 106 between for example a remote client 102 or other remote point 105, and for example a server 101 or other point network point 105, The recorded, tracked or estimated conditions that may be present or predicted on a path 106 to the remote client 102, may be produced by for example computing platform 126 on a second link or path 106 so that the conditions on the first link path 106 match the conditions on the second link or path 106. In some embodiments, this second path 106 may be to a client 103 that may be located proximate to server 101. A load tool 124 may initiate one or more transactions of an application 112 along the path 106, and processor 120 may alter, vary or change the network conditions along path 106. A memory 122 may collect and evaluate metrics of the performance of the transactions along path 106, and may compare such metrics to an SLO. The collected metrics may predict an SLO of a transaction of application 112 between for example remote client 102 and server 101 along path 106.

Network 100, otherwise called a computer network or an area network, may be implemented in many different shapes and sizes. Examples of networks 100 may include, without limitation and in various combinations, a Local Area Network (LAN), a Wide Area Network (WAN), a Metropolitan Area Network (MAN) or others. Hence, the network 100 may have various number of servers 101 or multi-tiered servers, electrically coupled to any number of workstations/clients 102 or points 105 over various types of communication paths 106 over various distances.

Network descriptions, such as LAN, WAN, and MAN, may sometimes imply a physical distance that the network 100 spans or a distance-based concept. For example, a LAN may connect network devices over a relatively short distance. A WAN may span a large physical distance and may include remote clients 102 that may be located in a different state or country. WANs may use technology like leased lines, cable modems, Internet, asynchronous transfer mode (ATM), Frame Relay, E1, T1, and X.25 for connectivity. Other terms, designations and distances may be used.

Server 101 or computing platform 126 may include for example a user interface 107, a memory unit 108, and a processor 109. Memory unit 108 may include one or more software applications 112. User interface 107 may include for example an output device 110 an input device 111 and in some cases more devices.

Server 101 may be implemented as, without limitation, a computer, a workstation, a personal computer, a handheld computer, a desktop computer, a laptop computer, and the like. Server 101 may be mobile, fixed, or convertible between mobile and fixed, depending on a particular implementation. Server 101 may be a computer adapted for a fixed implementation. In some embodiments, server 101 and computing platform 126 may share one or more of a processor 109, data storage or memory unit 108, user interface 107, an output device 110, an input device 111 or other components. In some embodiments, computing platform 126 and server 101 may be contained in the same unit.

Processor 109, may be a central processing unit (CPU) or controller, that may control some or all functions of server 101. Processor 109 may execute, retrieve, transfer, and decode instructions over communication paths, internal or external to the server 101, and may retrieve, transport or store data to or from peripherals and components of server 101. The processor 109 may include or be connected to an interface to such elements that may be located outside the server 101, but communicating with the processor 109, such as via the communication path 106.

Memory unit 108 may include without limitation, a hard drive, read only memory (ROM), and random access memory (RAM) or other data storage units. Memory unit 108 may be of a suitable size to accommodate one or more applications 112 and other program and storage needs. Application 112, may be for example executable applications deployed over a WAN. Application 112 may take other forms and serve other or additional functions.

In the user interface 107, the input device 111 may permit a user to input information into the server 101 or computing platform 126. Output device 110 may permit a user to receive information from the server 101 or computing platform 126. Input device 111 may be a keyboard, but also may be a touch screen, a microphone with a voice recognition program, or other devices. Output device 110 may be or include for example a display, but also may be a speaker, for example or other output device. Output device 110 may provide information to the user responsive to the input device 111 receiving information from the user or may be responsive to other activity by the server 101 or computing platform 126. For example, the display may present information responsive to the user entering information in the server 101 or computing platform 126 via a keypad.

Server 101 or computing platform 126 may contain other elements, including, without limitation, a data input interface and a data output interface that may provide communication ports that permit data to be received by and sent from, respectively, server 101 or computing platform 126. The data input interface and the data output interface may be the same interface, permitting bidirectional communication, or may be different interfaces, permitting opposite, unidirectional communication. Examples of the data input interface and the data output interface include, without limitation, parallel ports, and serial ports, such as a universal serial bus (USB).

Client 102 may be implemented as, without limitation, a computer, a workstation, a personal computer, a handheld computer, a desktop computer, a laptop computer, communication device and the like. Client 102 may be mobile, fixed, or convertible between mobile and fixed, depending on the particular implementation. Client 102 may be adapted for a fixed implementation.

Communication path 106 may electrically or electronically couple the server 101 and/or computing platform 126 to one or more of clients 102. Communication path 106 may be or include wired and/or wireless components and may accommodate the fixed and/or mobile server 101 or clients 102, respectively. Examples of wired communication paths include, without limitation, LANs, leased WAN circuits, ATM, frame relay. Examples of wireless communication paths include, without limitation, wireless LANs, microwave links, satellite.

Network 100 may also include an external data storage unit 113 for storing software applications 112 or other applications, data or instructions. Unit 113 may include, without limitation, one or more of the following: a hard drive, read only memory (ROM), and random access memory (RAM). Unit 113 may be of suitable size to accommodate application 112, and other program and storage needs. Unit 113 may in some embodiments be used in cooperation with or as a substitute for the memory unit 108 in the server 101.

Computer readable product 114, such as a computer readable storage medium, a disk (such as a compact disk (CD)), for example, or other portable storage medium containing an executable code may in some embodiments contain instructions that may perform a method in accordance with an embodiment of the invention.

Network condition processor 120 may be or include a processor separate from processor 109, or may be or include software that may run on or from processor 109 or from another processor. In some embodiments, network condition processor 120 may be included in a unit that is separate from server 101. In some embodiments, network condition processor 120 may include physical connections to and from server 101 and one or more of clients 102.

Network condition processor 120 may include or be connected to a memory 122 that may be part of or separate from memory unit 113. Network condition processor 120 may include instructions to for example impose a delay or latency in the transmission of packets or other data units that may be passed to or from server 101 to client 102 or to other units 105 that may be connected to network 100 and processor 120. In some embodiments, processor 120 may impose or produce bandwidth limitations or other constraints or interferences on network traffic to, from or between server 101, clients 102 or other points 105 of network 100. Processor 120 may also impose or produce network conditions or constraints such as bandwidth utilization, jitter, packet loss, jitter rate, filtering, route changes, queuing, load balancing, packet modification, quality of service mechanisms, multi protocol label switching, virtual LAN, out-of-order, packet duplication, fragmentation, time to live effects, link faults such as bit errors and disconnections and other network conditions that may be experienced of effect data transfers over a network 100, such as between server 101 and a client 102.

In some embodiments, processor 120 may alter or change one or more network conditions that it produces on for example a path 105 to remote client 102 so that various permutations of network conditions are altered or kept unchanged, and so that some or all of the combinations of network conditions are tested. For example, processor 120 may increase jitter on a network connection or path with remote client 102 or client 103, while holding packet loss and other conditions constant or unchanged. Similarly, processor 120 may alter or vary two or more network conditions that it produces while keeping other conditions constant. In some embodiments, processor 120 and for example memory 122 may record data, such as for example metrics of performance of a transaction over a network between for example server 101 and client 103. In some embodiments, a performance metric may be compared to a service level objective for such metric, and a prediction of the level of service that will exist on the path 105 to remote client 102 may be made.

In some embodiments, an estimate may be made of a range of network conditions or values, or of the severities or prominence of such conditions on a link or network path 105 to remote client 102. One or more permutations or instances of such conditions within such range may be produced on the link with client 103, and metrics of the performance of the transaction of an application may be collected. In some embodiments a prediction may be made of a value or severity of a network condition at which the service provided in a transaction with one or more remote clients 102 may fail to reach a service level objective.

In some embodiments, server 101 and client 103 may be connected to processor 120, and may be removed from some or all of the connection to network 100 or to parts of network 100, during for example a test of adherence to an SLO of one or more transactions of an application 112 between for example server 101 and client 103. For example, in some embodiments, processor 120 may produce network conditions on a link or path to client 103, that are similar to or essentially equivalent to those encountered by remote client 102 when executing a transaction. In some embodiments, processor 120 or a recording or memory device may monitor or record network conditions such as bandwidth, latency, bandwidth utilization, packet loss rate, jitter rate, filtering, route changes, queuing, load balancing, packet modification, Quality of Service mechanisms, multi protocol label switching (MPLS), virtual LAN (VLAN), out-of-order, packet duplication, fragmentation, time to live (TTL) effects, link faults such as bit errors and disconnections, congestion and others on network 100, and produce such conditions in a path 106 between or among processor 120, server 101 and client 103.

In some embodiments, a script or order or a list of transactions of an application to be executed may be stored on and executed from for example a load tool 124. A load tool may be or include for example a Mercury™ LoadRunner™ or Segue™ SilkPerformer™. Other load tools 124 may be used. A load tool 124 may be run for example from a set of instructions such as a software application or from other platforms Load tool 124 can also run from multiple computers.

In some embodiments, processor 120 may be or include one or more processors such as those available in a VE Network Appliance™ available from Shunra Software Ltd.™ of Kfar Sava, Israel. Other products or processors may be used as processor 120.

In some embodiments, a load tool 124 or some other memory and/or processing device may initiate one more transactions of one or more applications 112 from or between server 101 and clients 102 and/or for example virtual clients or other network points 105 when conditions on path 106 match the actual or predicted conditions on path 106 to client 103. In some embodiments, load tool 124 may increase a number, frequency, size, complexity or other characteristics of transactions between for example server 101 and client 103, and/or may increase or decrease a number of users, a frequency of log-ons by users, a ramp-up time between log-ons by clients such as client 103 or other permutations of users and transactions of an application 112 between or among clients 103, servers 101 or other points 105 of network 100.

In some embodiments, concurrently with, or at some other period when, for example load tool 124 is running, initiating, executing or processing transactions of application 112 between or among for example client 103, server 101 or other network components, processor 120 may produce, alter or vary one or more network conditions on a path 106 between for example client 103 and server 101 to match a range of conditions that may be encountered by client 102 when it executes a transaction of application 112. In some embodiments, all or some of the transactions initiated by for example load tool 124 may be initiated under one or more network conditions that may be produced by processor 120. In some embodiments, a memory such as unit 113 or another data storage unit may store performance metrics of transactions that are executed while network conditions are varied. In some embodiments, the transactions initiated by for example load tool 124 may be coordinated with the variations or changes in for example network conditions that are produced by for example processor 120, so that for example, one or more of a particular series of transactions is executed for each of the desired network conditions that is applied to a path 106 or network link by for example processor 120.

In some embodiments, a rating or evaluation of one or more transactions of an application 112 may include a TRT of a transaction, and a comparison of the TRT to an SLO. In some embodiments such rating or comparison may be expressed as for example a pass/fail of the execution of such transaction within the limits of the SLO. Other criteria that may be evaluated may include a general success rate or completion of requested transactions of an application over network 100, also know as availability, the percentage of transactions that meet an objective, also known as performance, and a diversity rate, or for example a standard deviation of successful responses from an objective, also known as consistency. Other factors may be considered.

Performance, availability, and consistency, may in some embodiments be expressed or calculated as follows:

$$\text{Performance} = 100 * \frac{\sum \text{tps\_passed\_SLO}}{\sum \text{tps\_passed} + \sum \text{tps\_failed}}$$

$$\text{Availability} = 100 * \frac{\sum \text{tps\_passed}}{\sum \text{tps\_passed} + \sum \text{tps\_failed}}$$

$$\text{Consistency} =$$

$$\left\{ 1 - \frac{\frac{\sqrt{\sum (\text{response\_time} - AverageResponseTime)^2 *}}{\text{tps\_passed}}}{\sum \text{tps\_passed}}}{AverageResponseTime} \right\} *100$$

where $$AverageResponseTime := \frac{\sum (\text{tps\_passed} * \text{response\_time})}{\sum \text{tps\_passed}}$$

Other criteria, evaluations and calculations are possible.

The measures of one or more of availability, performance and consistency may be classified in ranges, such that for example, a performance rate of between 0-55% may be unacceptable, while performance of between 56% and 100% may be acceptable. Using such classifications may enable a user to easily appreciate the results of testing in light of acceptability criteria that may have for example been pre-defined. Further classification of test results may let a user gauge for example more than one criterion at a time. For example, a test of a transaction of an application 112 under various produced network conditions may have yielded a 60% performance rate, which rate may be generally acceptable, but a 78% consistency rate. The 78% consistency rate may downgrade the otherwise acceptable performance rate to a not-acceptable result. Other combinations of criteria and classifications, with other designations are possible.

In some embodiments, a processor may, when determining a compliance of a transaction of an application 112 to a service level under a particular set of network communication constraints, assign a weight, relative importance or value to one or more particular transactions. For example, a transaction of an application 112 that fails to meet an SLO when for example several clients 103 are executing a transaction simultaneously, may be given less weight in determining compliance with an SLO than a transaction of an application that fails to meet an SLO when for example a typical number of clients are executing typical transactions under typical network conditions.

Figure 2:
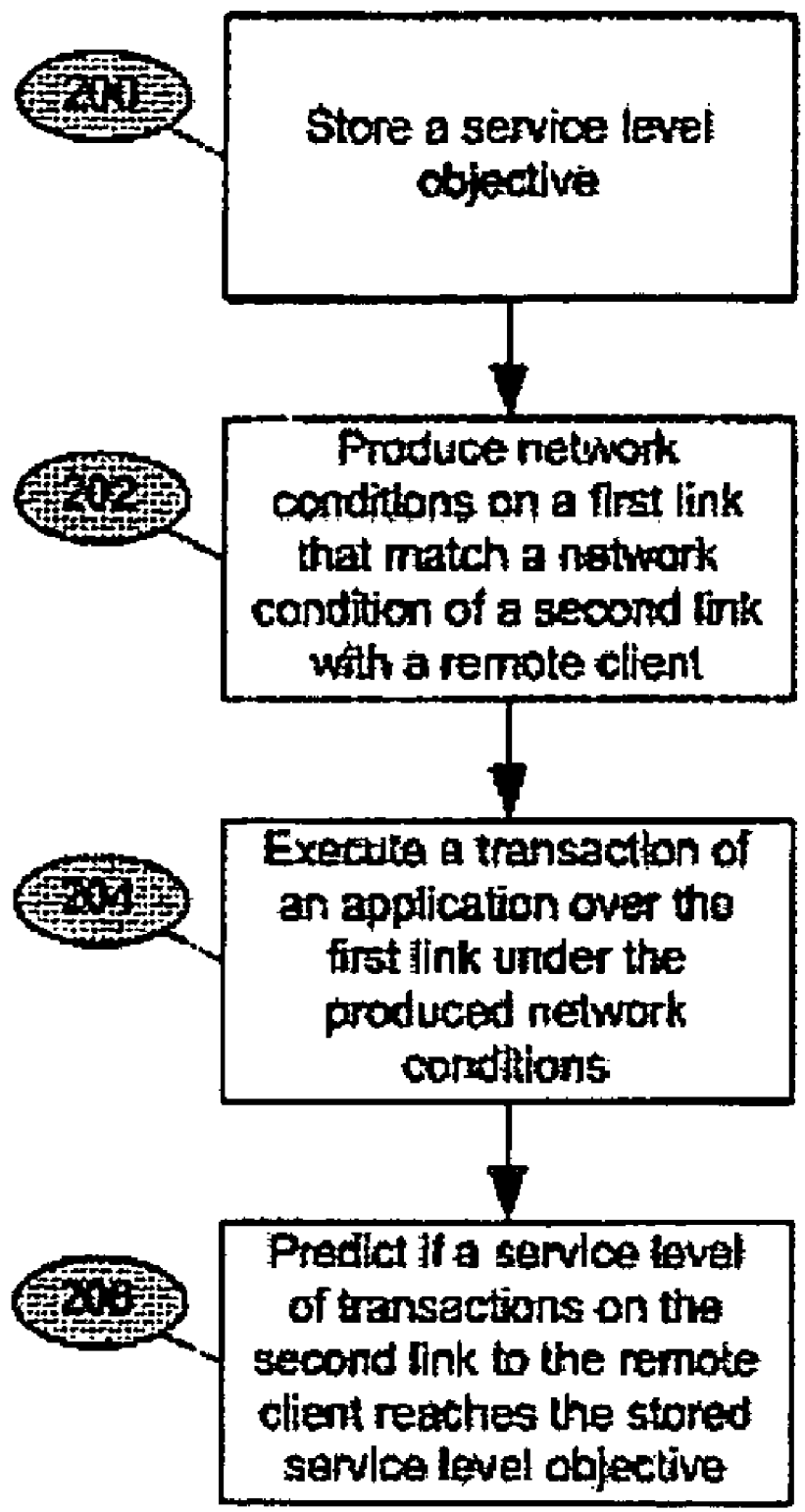
FIG. 2 illustrates a process for evaluating a service level at a remote location of one or more transactions of an application, in accordance with a preferred embodiment of the present invention.

Reference is made to FIG. 2, a flow diagram of a method in accordance with a preferred embodiment of the present invention. In block 200, a service level objective of for example a performance of a transaction of an application under a particular network condition or set of network conditions may be stored in for example a memory.

In block 202, a processor or computing platform may produce or generate one or more network conditions on a first link of a network to a client. The produced conditions may match a set of conditions that may be encountered or faced by a client at a remote network location, on this or another network, when such remote client executes a transaction or an application on this or another network link. In some embodiments, the conditions produced may match the actual conditions encountered by the remote client. In some embodiments, such conditions, or the values of for example latency, lag or other conditions may be derived from a recording of a communication on a link to such remote client. In some embodiments the conditions may match a set of assumed or estimated conditions that may be faced or that could be faces by the remote client on a network link.

In some embodiments, one or more of the following conditions may be altered, changed or varied to match an actual, predicted or estimate condition on a link or path with a remote client: bandwidth, latency, bandwidth utilization, packet loss rate, jitter rate, filtering, route changes, queuing, load balancing, packet modification, Quality of Service mechanisms, MPLS, VLAN, out-of-order, packet duplication, fragmentation, TTL effects, link faults such as bit errors and disconnections, congestion. Other conditions may be produced.

In some embodiments, one or more network conditions may be altered concurrently, and one or more conditions may be held unchanged, so that a transaction of an application may be tested on some or all of the various permutations or combinations of network conditions that may be faced on the link with a remote client.

In block 204, a processor, server or computing platform may execute a transaction of an application over the link where the produced conditions are in effect. A memory may record a set of metrics or other measures of the performance of the transaction of the application under the produced network conditions or under various permutations or possibilities of various conditions. In some embodiments, the collected metrics may be calculated into a service level. In some embodiments, a calculation of a service level may include a calculation of any or all of a performance rate, a success rate and a consistency rate of a transaction under a particular set of network conditions. In some embodiments, such performance characteristics or other measures or levels of performance may be calculated as an overall quality of service faced by a remote client in the performance of a transaction of an application. In some embodiments, there may be executed a list or script of transactions at one or more network conditions, and performance metrics may be collected at one or more of such transactions when the link is subject to the one or more changed network conditions.

In some embodiments, a performance metric may be collected when for example there are multiple clients performing the same or different transactions of the same or different applications. In some embodiments, metrics may be collected when or after several clients are logging on or off at variable times and with various frequencies or ramp up rates.

In block 206, a prediction may be made of a service level at a remote client upon the performance of a transaction of an application, on the basis of the service level of such performance on the link where the produced conditions were in effect. Such prediction may include an estimation of whether the service levels match the stored service level objective. In some embodiments, the predicting may include predicting a maximum number of clients whose transaction of the application meet the stored service level objective. In some embodiments, the predicting may include predicting a value of a network condition where the service provided to a remote client on a transaction of an application fails to reach the stored service level objective.

Such metrics or calculations may be for example stored in a memory, and/or compared to a stored or pre-defined SLO. For example, a network operator or other user, may have defined an SLO of for example a 70% performance rate with an 80% consistency rate for of a series of transactions on an application under a given set of network constraints. A user or operator may alter, vary or change for example a bandwidth rate, then run the same or a similar series of transactions, and collect the same or similar set of metrics. This process may be repeated as some or many combinations of constraints or network conditions are imposed. A processor or a user or operator may determine for example at what levels of network conditions a service level for a transaction or series of transactions will fail to reach a pre-defined SLO.

In some embodiments, multiple clients or virtual clients may initiate or execute a transaction of an application at a particular time, or may log-on and join a network over a pre-defined or random periods at pre-defined or random intervals.

In some embodiments, a method of the present invention may be implemented by a series of instructions that may for example be stored on a magnetic storage unit such as a disc drive.

In some embodiments, a software tool, such as Mercury™ LoadRunner™ or Segue™ SilkPerformer™ may capture performance metrics when for example a client executes particular functions of an application. In some embodiments, one or more clients, servers or points of a network may be linked into a test LAN that may include a processor to produce network conditions. Such LAN may in some embodiments not be connected to other components of a network while metrics of the application are being collected.

It will be appreciated by persons skilled in the art that embodiments of the invention are not limited by what has been particularly shown and described hereinabove. Rather the scope of at least one embodiment of the invention is defined by the claims below.

I claim:

1. A method comprising:
   storing a service level objective;
   producing a network condition on a first network link, said network condition matching said network condition on a second network link, said second network link connecting to a remote network location;
   executing a transaction of an application over said first network link; and
   predicting on the basis of an actual service level of said transaction of said application on said first network link, whether a service level of said transaction of said application over said second network link would reach said service level objective.

2. The method as in claim 1, wherein said storing said service level objective comprises storing a metric selected from the group consisting of performance rate, success rate and consistency of said transaction of said application.

3. The method as in claim 1, wherein said producing said network condition comprises producing a network condition in a range of network conditions found on said second network link.

4. The method as in claim 3, wherein said producing comprises altering concurrently a plurality of network conditions while keeping said network condition constant.

5. The method as in claim 1, wherein said producing comprises altering a network condition selected from the group consisting of bandwidth, latency, packet loss, filtering, route changes, queuing, load balancing, packet modification, quality of service mechanisms, multi protocol label switching, virtual LAN, out-of-order, packet duplication, fragmentation, time to live effects, link faults, congestion and bandwidth utilization.

6. The method as in claim 1, wherein said storing said service level comprises storing a quality of experience rate of said transaction of said application.

7. The method as in claim 1, comprising storing a ramp up rate of a plurality of users of said application on said network.

8. The method as in claim 1, wherein said predicting comprises predicting a maximum number of clients whose transaction of said application meet said service level objective.

9. The method as in claim 1, wherein said predicting comprises predicting a value of said network condition at which said transaction fails to reach said service level objective.

10. The method as in claim 1, comprising generating a plurality of concurrent transactions of said application on said network, by a plurality of users.

11. The method as in claim 1, comprising storing a series of pre-defined transactions; executing said plurality of pre-defined transactions, and recording a service level for one of said pre-defined transaction.

12. The method as in claim 1, comprising deriving a value for said network condition from a communication over said second network link.

13. The method as in claim 1, comprising executing said transaction over a third network link, concurrently with an execution of said transaction over said second network link.

14. A system comprising:
   a memory to store a service level objective; and
   a processor to:
      produce a network condition on a first network link, said network condition matching said network condition on a second network link, said second network link connecting to a remote network location;
      execute a transaction of an application over said first network link; and
      predict on the basis of an actual service level of said transaction of said application on said first network link, whether a service level of said transaction of said application over said second network link would reach said service level objective.

15. The system as in claim 14, wherein said memory is to store a metric selected from the group consisting of performance rate, success rate and consistency of said transaction of said application.

16. The system as in claim 14, wherein said processor is to produce a network condition in a range of network conditions found on said second network link.

17. The system as in claim 16, wherein said processor is to alter concurrently a plurality of network conditions while keeping said network condition constant.

18. The system as in claim 14, wherein said processor is to alter a network condition selected from the group consisting of bandwidth, latency, packet loss, filtering, route changes, queuing, load balancing, packet modification, quality of service mechanisms, multi protocol label switching, virtual LAN, out-of-order, packet duplication, fragmentation, time to live effects, link faults, congestion and bandwidth utilization.

19. The system as in claim 14, wherein said memory is to store a quality of experience rate of said transaction of said application.

20. The system as in claim 14, wherein said memory is to store a ramp up rate of a plurality of users of said application on said network.

21. The system as in claim 14, wherein said processor is to predict a maximum number of clients whose transaction of said application meet said service level objective.

22. The system as in claim 14, wherein said processor is to predict a value of said network condition at which said transaction fails to reach said service level objective.

23. The system as in claim 14, wherein said processor is to generate a plurality of concurrent transactions of said application on said network, by a plurality of users.

24. The system as in claim 14, wherein
said memory is to store a series of pre-defined transactions; and
said processor is to
execute said plurality of pre-defined transactions, and
record a service level for one of said pre-defined transaction.

25. The system as in claim 14, wherein said processor is to derive a value for said network condition from a communication over said second network link.

26. The system as in claim 14, wherein said processor is to execute said transaction over a third network link, concurrently with an execution of said transaction over said second network link.

* * * * *